US009395443B2

United States Patent
Trilles et al.

(10) Patent No.: US 9,395,443 B2
(45) Date of Patent: Jul. 19, 2016

(54) ADAPTIVE METHOD FOR ESTIMATING THE ELECTRON CONTENT OF THE IONOSPHERE

(71) Applicant: THALES, Neuilly-sur-Seine (FR)

(72) Inventors: Sebastien Trilles, Toulouse (FR); Gonzague Bertin De La Hautiere, Toulouse (FR); Mathias Van Den Bossche, Goyrans (FR)

(73) Assignee: Thales, Courbevoie (FR)

( * ) Notice: Subject to any disclaimer, the term of this patent is extended or adjusted under 35 U.S.C. 154(b) by 693 days.

(21) Appl. No.: 13/789,291

(22) Filed: Mar. 7, 2013

(65) Prior Publication Data

US 2013/0234886 A1    Sep. 12, 2013

(30) Foreign Application Priority Data

Mar. 9, 2012   (FR) ...................................... 12 00717

(51) Int. Cl.
   *G01S 19/07*   (2010.01)
   *G01S 19/21*   (2010.01)
   *G01S 19/40*   (2010.01)

(52) U.S. Cl.
   CPC  *G01S 19/21* (2013.01); *G01S 19/40* (2013.01)

(58) Field of Classification Search
   CPC ................................. G01S 19/21; G01S 19/40
   USPC ................................................. 342/357.44
   See application file for complete search history.

(56) References Cited

U.S. PATENT DOCUMENTS

| 5,428,358 | A | 6/1995 | Gardner |
| 2006/0017610 | A1 | 1/2006 | Komjathy et al. |
| 2010/0169001 | A1* | 7/2010 | Scherzinger ............ G01S 19/43 701/467 |
| 2012/0286991 | A1* | 11/2012 | Chen ...................... G01S 19/04 342/357.23 |

FOREIGN PATENT DOCUMENTS

WO         2007032947 A1    3/2007

OTHER PUBLICATIONS

Elliott D. Kaplan et al., "Understanding GPS Principles and Applications", Artech House, 2005, pp. 9.
"Approval Guidance for RNP Operations and Barometric Vertical Navigation in the U.S. National Airspace System", U.S. Department of Transportation Federal Aviation Administration, Jan. 23, 2009, pp. 39, AC No. 90-105.

(Continued)

*Primary Examiner* — Frank J McGue
(74) *Attorney, Agent, or Firm* — Baker & Hostetler LLP (57) ABSTRACT

An adaptive method for estimating the electron content of the ionosphere comprises: collecting a set of measurements carried out by a plurality of beacons receiving radio frequency signals transmitted by a plurality of transmitting satellites; computing coordinates of the points of intersection between the transmission axis of the signals and a surface surrounding the Earth, and of a vertical total electron content determined at each of these points; computing a vertical total electron content for each of the nodes of an initial mesh of the surface; a statistical dispersion analysis of the vertical total electron content; a computation step making it possible to define a suitable statistical estimator, or a computation step making it possible to generate a suitable mesh of the surface; a statistical error analysis making it possible to select between a validation of the adaptation of the method and a stopping of the method.

13 Claims, 7 Drawing Sheets

(56) References Cited

OTHER PUBLICATIONS

Xingliang Huo, et al., "Monitoring the Daytime Variations of Equatorial Ionospheric Anomaly Using IONEX Data and CHAMP GPS Data", IEEE Transactions on Geoscience and Remote Sensing, Jan. 1, 2011, pp. 105-114, vol. 49, No. 1, IEEE Service Center, Piscataway, NJ, USA, XP011340485.

Wayan Suparta, "Proposed Physical Mechanism for Upper-Lower Atomspheric Coupling from GPS Perspective", 2011 IEEE International Conference on Space Science and Communication, Jul. 12, 2011, pp. 125-129, XP032052047.

F. Walter, et al., "Brazilian Contributions to the Study of the Ionosphere: Electron Content", 2009 SBMO/IEEE MTT-S International Microwave and Optoelectronics Conference, Nov. 3, 2009, pp. 1-5, XP031646821.

\* cited by examiner

ADAPTIVE METHOD FOR ESTIMATING THE ELECTRON CONTENT OF THE IONOSPHERE

CROSS-REFERENCE TO RELATED APPLICATION

This application claims priority to foreign French patent application No. FR 1200717, filed on Mar. 9, 2012, the disclosure of which is incorporated by reference in its entirety.

FIELD OF THE INVENTION

The present invention relates to the field of the methods for estimating the electron content of the ionosphere that are capable of establishing corrections for the navigation systems, and more particularly an adaptive method making it possible to enhance the estimation of this electron content in the case of strong non-uniformities of the ionosphere.

BACKGROUND

In the satellite positioning systems, commonly called GNSS, standing for Global Navigation Satellite System, a fixed or mobile receiver such as a vehicle or an aircraft is located by triangulation by means of a calculation of the distances separating it from a plurality of satellites. The accuracy of the evaluation of distance between the receiver and each of the satellites is a determining factor in the positioning accuracy obtained. The main source of error in the evaluation of this distance is the aggregate delay accumulated by the signal when it passes through the ionosphere, where the partial ionization of the gases at high altitude disturbs the propagation of the signal and results in a variable transmission delay.

It is necessary to be able to have an estimation of the electron content of the Earth's ionosphere, commonly called TEC, standing for Total Electron Content, in order to take into account, for each satellite signal considered, the delay accumulated in passing through the ionosphere. In practice, the receiver calculates its position by integrating a number of corrections of the apparent distances transmitted by the satellites, by means of various integration and filtering techniques. The estimation of the electron content of the ionosphere makes it possible to enhance the accuracy of the calculation of the point (position, speed, time-stamp).

For this, the known GNSS systems can be complemented by so-called augmentation systems which deliver real time corrections linked to the activity of the ionosphere. Augmentation systems based on satellites, commonly called SBAS, standing for Satellite-Based Augmentation System, are used. Such is the case, for example, of the EGNOS system for Europe, which broadcasts, from a plurality of geostationary satellites, correction data to the GPS systems.

Various methods are considered to make it possible to estimate the electron content of the ionosphere and takes its impact into account in the navigation systems. In a known approach, commonly called TRIN model, standing for TRiangular INterpolation, the ionosphere is likened to a thin layer around the terrestrial globe in which is accumulated all of the electron charge of the ionosphere.

The delay of a signal transmitted by a satellite, situated at an altitude above the thin layer, to a receiver situated at a lower altitude than the thin layer, is then estimated by means of the point of intersection of the thin layer with the signal transmission axis, also called line of sight, from the satellite to the receiver. This point is commonly called IPP, standing for Ionosphere Pierce Point. The delay of a signal passing through the thin layer at a given point IPP is determined by means of the vertical total electron content determined at this point for a single-frequency user. The Vertical Total Electron Content, or VTEC, represents the total electron charge of the ionosphere that would have been perceived by a signal passing through this IPP and passing through the thin layer along a vertical axis.

The estimation of the vertical total electron content VTEC makes it possible to establish a mapping of the ionospheric delays in the form of a spherical grid centered on the Earth, situated at altitude and immobile relative to the Earth. The user will then use this grid, commonly called IONO grid, to calculate the ionospheric delay on the lines of sight of each satellite considered, by linear interpolation on this grid. A regular update of the values of the IONO grid, typically every 30 seconds, is broadcast by the SBAS systems to users of the navigation system.

Figure 1:
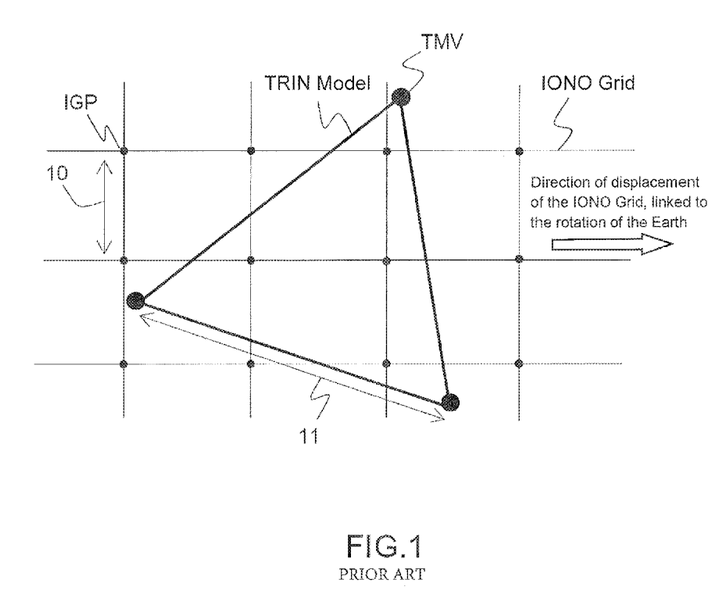
FIG. 1, already presented, illustrates, in plan view, the meshes of the IONO grid and of the TRIN model as well as the associated terminologies, FIGS. 2.a and 2.b, already presented, illustrate the principle of a known method for estimating the electron content of the ionosphere, FIGS. 3.a and 3.b, already presented, illustrate the principle of the method in a simplified case of a one-dimensional distribution.

According to one known method, the IONO grid which is accessible to the users of the navigation systems is calculated by interpolation from a second mesh mapping the measurements of the vertical total electron content VTEC. Unlike the IONO grid, this second mesh is not linked to the rotation of the Earth. The second mesh keeps a fixed solar time, the exposure to the sun of each of the nodes of the mesh being constant. The mesh thus becomes independent of the strong changes of the ionospheric layer during a day. In the approach known as TRIN model the second mesh is formed by a regular polyhedron centered on the Earth that has one thousand two hundred and eighty triangular faces. Each of the six hundred and forty-two vertices positioned around the terrestrial globe has an associated evaluation of the vertical total electron content VTEC. FIG. 1 illustrates, in plan view, the meshes of the IONO grid and of the polyhedron of the TRIN model. The nodes of the IONO grid are called IGP, standing for Ionospheric Grid Point, the nodes of the polyhedron of the TRIN model are called TMV, standing for Trin Model Vertex. Typically, the distance 10 separating two IGP nodes is approximately 550 km at the equator, this distance decreasing as a function of latitude. The distance 11 separating two nodes TMV is approximately 950 km.

Figure 2A:
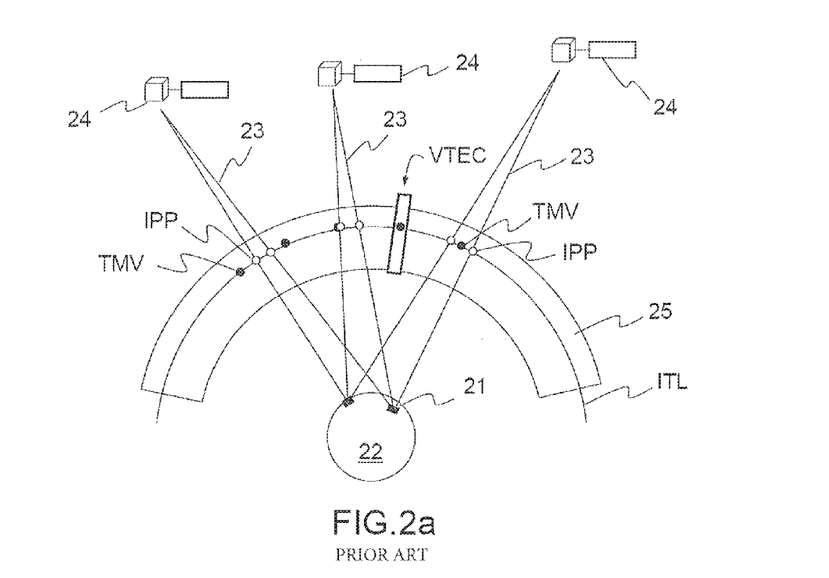
Figure 2B:
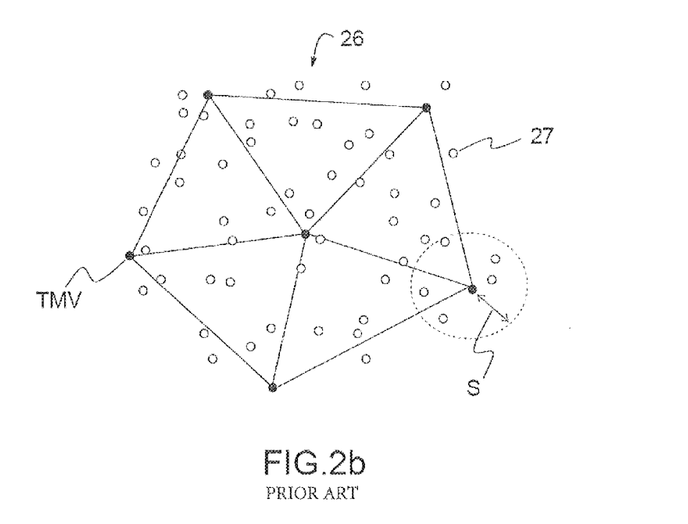

FIGS. 2.a and 2.b illustrate the principle of the method for estimating the electron content of the ionosphere that is implemented these days for the correction of the navigation systems.

A plurality of receiving beacons 21 situated on the surface of the terrestrial globe 22 picks up a set of signals 23 transmitted by a plurality of navigation satellites 24 situated in orbit. The ionosphere 25 is likened to a thin layer around the terrestrial globe in which is accumulated all of the electron charge. ITL, standing for Ionosphere Thin Layer, denotes the surface, spherical for example, of the thin layer. The vertices TMV of a polyhedron called IPM, standing for Ionosphere Polyhedral Mesh, forms the mesh of the TRIN model. The vertices TMV are positioned on the surface ITL.

It is known that the reception by a beacon 21 of a signal 23 transmitted by a satellite 24 on two frequencies, for example the GPS L1 and GPS L2 frequencies, makes it possible, by a technique known to a person skilled in the art, to determine the distance between the beacon 21 and the satellite 24, as well as the electron content all along the transmission axis of the signal. For more details on this technique, reference can be made to the work entitled "Understanding GPS Principles and Applications", Elliott D. Kaplan, 2005, Artech House.

According to this technique, it is possible, for each dual-frequency signal 23, to determine an estimation of the vertical total electron content VTEC, for the point IPP of intersection between the transmission axis of the signal 23 and the surface ITL.

As represented in FIG. 2.b, the collection of a set of measurements produced by a plurality of receiving beacons 21 receiving radio frequency signals transmitted by a plurality of transmitting navigation satellites 24 situated in orbit, makes it possible to construct a cloud 26 of points 27 on the surface ITL; each point 27 of the cloud 26 being characterized by spatial coordinates of the IPP and by an estimation of the vertical total electron content VTEC at this point.

In a known method, an estimation of the vertical total electron content $VTEC_i$ at each of the vertices TMV of the mesh IPM is produced by means of a Kalman filter from a selection of points 27 situated at a distance from the vertex TMV less than a predetermined threshold S.

From this mapping of $VTEC_i$ values on the mesh IPM, a VTEC mapping is determined on the IONO grid, for example by linear interpolation. This mapping is then made available to the users of the navigation systems, for example by means of the augmentation systems such as EGNOS.

Figure 3A:
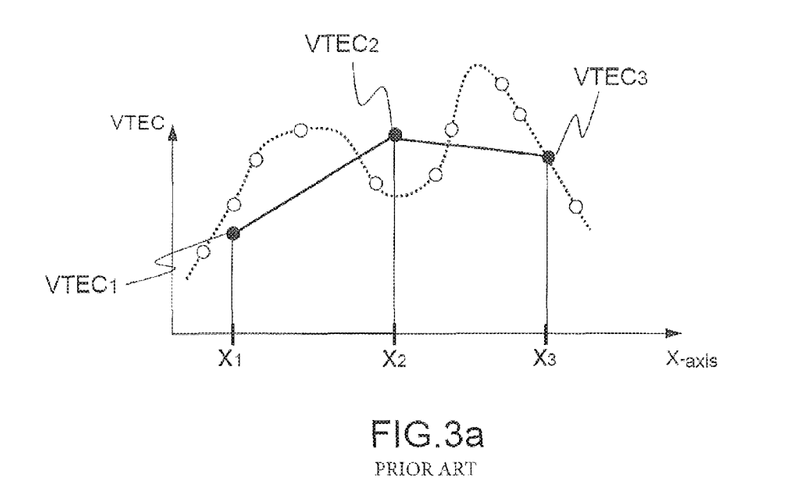
Figure 3B:
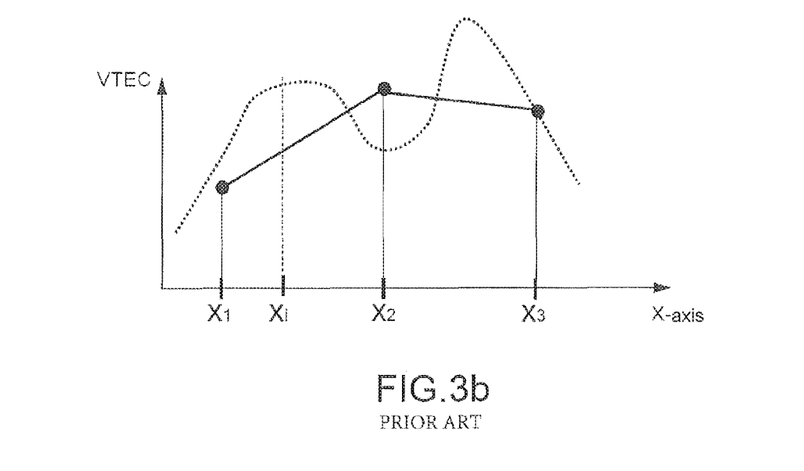

FIGS. 3.a and 3.b illustrate the principle of the method in a simplified case of a one-dimensional distribution. From a distribution of measured VTEC values associated with their abscissa IPP, the method estimates values $VTEC_1$, $VTEC_2$ and $VTEC_3$ for predetermined abscissa $x_1$, $x_2$ and $x_3$ corresponding to the vertices TMV in the simplified case of a one-dimensional mesh.

Typically, the calculation of $VTEC_2$ is constrained by the need to have a straight line pass through the point $VTEC_1$ to the abscissa $x_1$ and another point through the point $VTEC_3$ to the abscissa $x_3$, as well as by the constraint of positioning $VTEC_2$ as close as possible to the point cloud. The method is repeated successively for each of the points along the x-axis. As represented in FIG. 3.b, the estimation of the total electron content for a given abscissa $x_i$ by means of the support points $x_1$, $x_2$ and $x_3$ can, depending on the cases, prove relatively far removed from the total electron content measurements. FIGS. 3.a and 3.b illustrate two limitations of the approach currently implemented: the error committed on the estimation of the total electron content on the nodes of the mesh and the non-linearity of the estimation of the total electron content in proximity to the nodes of the mesh.

The method for estimating the electron content of the ionosphere currently implemented allows for a positioning calculation whose accuracy is sufficient when the non-uniformities of the electron content of the ionosphere are small. On the other hand, when the ionosphere exhibits a greater activity, for example during peaks of solar activity, strong amplitude non-uniformities are observed in small geographic surface areas. The existing methods for estimating the ionospheric electron content, such as the TRIN model, do not allow for an estimation that is accurate enough to generate reliable corrections, and allow for a satisfactory positioning by the users of the navigation systems.

SUMMARY OF THE INVENTION

The invention aims to propose an alternative solution for estimating the total electron content of the ionosphere by overcoming the implementation difficulties cited above.

To this end, the subject of the invention is an adaptive method for estimating the electron content of the ionosphere, characterized in that it comprises the following steps carried out in succession:

a collection of a set of measurements carried out by a plurality of fixed receiving beacons on the ground receiving radio frequency signals transmitted by a plurality of transmitting navigation satellites situated in orbit, a computation, for each of the signals of the set of measurements, of the spatial coordinates of the point of intersection between a transmission axis of the signal and a surface surrounding the Earth, and a vertical total electron content determined at this point of intersection; a cloud of points, made up of the spatial coordinates of the point of intersection and of a vertical total electron content being thus defined, a computation, by means of a statistical estimator, of a vertical total electron content, for each of the nodes of an initial mesh of the surface, a statistical dispersion analysis of the vertical total electron content at each of the nodes of the initial mesh, making it possible to select between two predetermined disturbance levels, a weak disturbance or a strong disturbance, of the ionosphere, a step comprising:
  in the case of a weak disturbance, a computation making it possible to define a suitable statistical estimator, from the initial statistical estimator,
  in the case of a strong disturbance, a computation making it possible to generate a new suitable mesh of the surface, from the initial mesh, a statistical error analysis of the vertical total electron content determined, by means of the suitable statistical estimator and of the initial mesh in the case of a weak disturbance, or by means of the initial statistical estimator and the suitable mesh in the case of a strong disturbance; the statistical error analysis making it possible to select between two predetermined error levels, a weak error which implies a validation of the adaptation of the method, or a strong error which implies the stopping of the method.

BRIEF DESCRIPTION OF THE DRAWINGS

The invention will be better understood, and other advantages will become apparent, on reading the detailed description of the embodiments given by way of example in the following figures.

DETAILED DESCRIPTION

Figure 4:
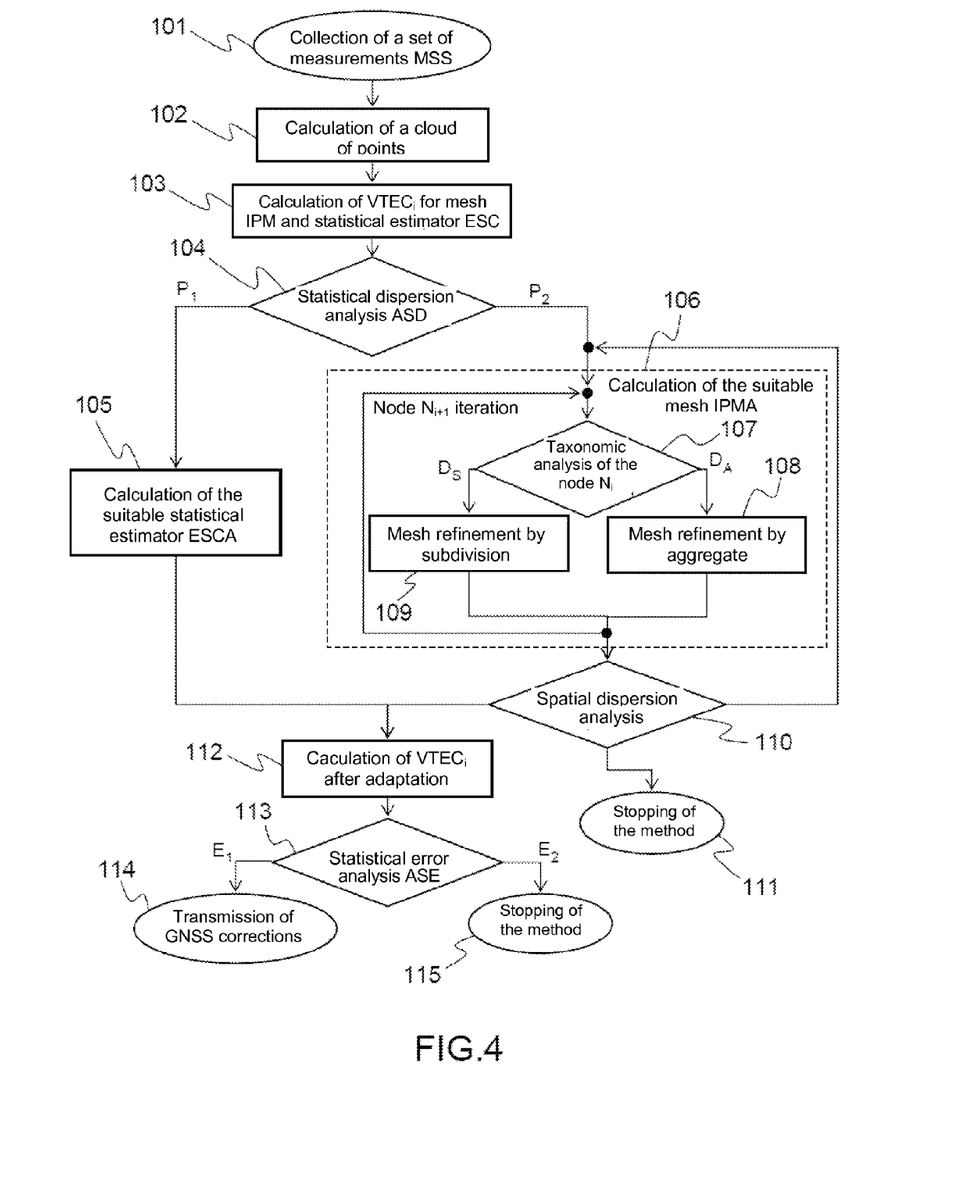
FIG. 4 illustrates, in the form of a flow diagram, a preferred embodiment of the adaptive method for estimating the electron content of the ionosphere according to the invention, FIGS. 5.a and 5.b illustrate the principle of the statistical dispersion analysis of the electron content of the ionosphere.

FIG. 4 illustrates, in the form of a flow diagram, a preferred embodiment of the adaptive method for estimating the electron content of the ionosphere according to the invention.

According to the invention, the method comprises a step 101 of collecting a set of measurements MSS produced by a plurality of fixed receiving beacons 21 on the ground receiving radio frequency signals 23 transmitted by a plurality of transmitting navigation satellites 24 situated in orbit.

On the same principle as described previously for FIG. 2.a, the reception by the beacon 21 of the signal 23 transmitted on two frequencies $f_1$ and $f_2$, makes it possible to determine two pseudo-distances $d_1$ and $d_2$ between the beacon 21 and the satellite 24, by means of the following simplified formula, stripped of measurement error with perfect clocks:

$$d_i = D + STEC/f_i^2 + T \quad (i)$$

in which STEC represents the total electron content along the line of sight of the signal 23 and T represents the delay accumulated by the signal when it passes through the troposphere. The set of measurements MSS comprises, for each signal 23, at least one distance, one TEC value and spatial coordinates of the line of sight of the signal.

The method comprises a step 102 of calculating, for each of the signals 23 of the set of measurements MSS, spatial coordinates of the point of intersection IPP between a transmission axis of the signal 23 and a surface ITL centered on the Earth, and a vertical total electron content VTEC determined at this point of intersection IPP. A cloud 26 of points 27 is thus defined; each point 27 being made up of the spatial coordinates of the point of intersection IPP and a vertical total electron content VTEC.

An estimation of the vertical total electron content VTEC at a point IPP is determined, from a set of measurements MSS, at least two using different frequencies, by a technique known to the person skilled in the art based on the following formula:

$$STEC(\epsilon) = VTEC \, s(\epsilon) \quad (ii)$$

in which $s(\epsilon)$ is a rabatment function dependent on $\epsilon$ representing the inclination of the line of sight. Reference can be made to the publication "Minimum Operational Performance Standards for Global Positioning System/Wide Area Augmentation System Airborne Equipment: RTCA DO-229D" published in December 2006 by the RTCA, (Radio Technical Commission for Aeronautics) detailing this calculation method.

In a preferred embodiment of the invention, the surface ITL used in the TRIN model is implemented. This choice offers a number of advantages as is described below. However, the invention is not limited to this surface; any surface surrounding the Earth, for example an edgeless compact surface centered on the Earth 22 being possible. Advantageously, a surface homeomorphic to a sphere positioned at altitude is implemented The method comprises a step 103 of calculating, by means of a statistical estimator ESC, a vertical total electron content $VTEC_i$ for each of the nodes $N_i$ of an initial mesh IPM of the surface ITL. In a preferred embodiment of the invention, the initial mesh IPM used in the TRIN model is implemented. The mesh IPM thus forms a regular polyhedron centered on the Earth that has one thousand two hundred and eighty triangular faces. The nodes $N_i$ of the mesh correspond to the six hundred and forty-two vertices TMV positioned around the terrestrial globe. The mesh IPM is not linked to the rotation of the Earth, each of the nodes keeps a fixed solar time.

The choice of an initial mesh IPM corresponding to the mesh used in the TRIN model offers a number of advantages as is described below. However, the invention is not limited to the mesh IPM; any type of mesh of the surface ITL is possible, the nodes being able to be at a fixed solar time or not and the number thereof being able to vary.

Advantageously, the statistical estimator ESC determines a vertical total electron content $VTEC_i$ at each of the nodes $N_i$ of the mesh IPM, by means of a Kalman filter that takes into account the points 27 of the cloud 26 positioned at a distance from the node concerned $N_i$ less than a predetermined threshold S.

The method comprises a step 104 of statistical dispersion analysis ASD of the vertical total electron content $VTEC_i$ at each of the nodes $N_i$ of the initial mesh IPM, making it possible to select between two predetermined disturbance levels, a weak disturbance $P_1$ or a strong disturbance $P_2$, characteristic of the activity of the ionosphere.

Advantageously, the statistical dispersion analysis ASD step 104 comprises the following steps carried out in succession:
- a selection, for each of the nodes $N_i$ of the initial mesh IPM, of a subset $SEP_i$ of points 27 positioned at a distance from the node considered $N_i$ less than a predetermined threshold $S_1$,
- a calculation, for each of the nodes $N_i$ of the initial mesh IPM, of a local dispersion $D_i$ calculated by statistical methods, such as, for example, a covariance or a least square residue, of the vertical total electron content VTEC of the points 27 of the subset $SEP_i$,
- a selection between the two disturbance levels of the ionosphere, $P_1$ or $P_2$, as a function of a local dispersion value $D_i$.

Advantageously, the statistical dispersion analysis ASD can be limited to a part of the mesh of the surface ITL, for example by retaining only the nodes exposed to the sun.

Figure 5A:
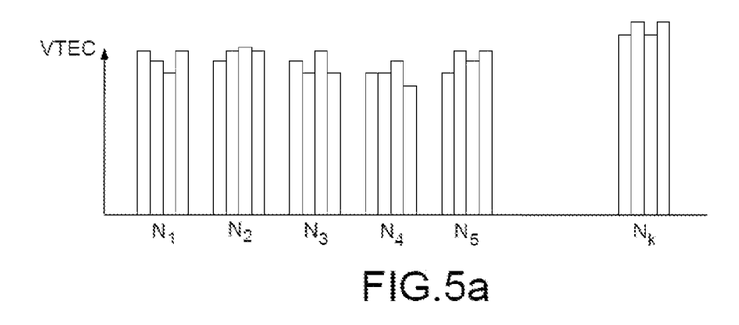
Figure 5B:
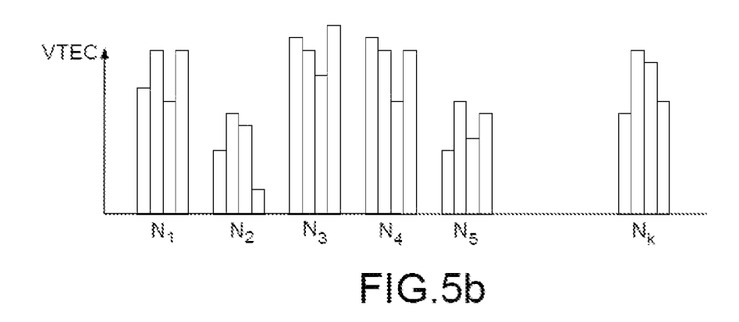

The statistical dispersion analysis ASD step 104 is also illustrated by FIGS. 5.a and 5.b described below.

The method comprises a step 105 of calculating an adapted statistical estimator ESCA, making it possible to determine, in addition to the vertical total electron content $VTEC_i$ at each of the nodes $N_i$, a spatial trend gradient $GSE_i$ of the vertical total electron content in proximity to the node considered $N_i$. An adapted statistical estimator ESCA is calculated when a weak disturbance $P_1$ is determined by the statistical analysis of the dispersions ASD.

Advantageously, the adapted statistical estimator ESCA makes it possible to calculate, at each of the nodes $N_i$ of the mesh IPM, a value of $VTEC_i$ and two slopes, determined in a predetermined spatial reference frame, defining the spatial trend gradient $GSE_i$ of the vertical total electron content VTEC in proximity to the node $N_i$ considered.

Advantageously, the adapted statistical estimator ESCA is determined by means of a multiple linear regression capable of taking into account the local inconsistencies of the VTEC measurements in proximity to the node $N_i$ considered. Thus, the adapted statistical estimator ESCA makes it possible to limit the nonlinearity of the vertical total electron content VTEC in proximity to the nodes $N_i$ of the mesh IPM.

On completion of the step 105, a calculation of the vertical total electron content $VTEC_i$ and of its spatial trend gradient $GSE_i$ is performed in a step 112 by means of the adapted statistical estimator ESCA at each of the points $N_i$ of the initial mesh IPM.

The method comprises a calculation step 106 making it possible to generate a new adapted mesh IPMA of the surface ITL, from the initial mesh IPM. In the case where a strong disturbance $P_2$ is determined by the statistical dispersion analysis ASD, an adapted mesh IPMA is determined from the initial mesh (IPM), according to an iterative process applied to each of the nodes ($N_i$) of the initial mesh (IPM) and comprising calculation steps 107, 108 and 109.

In a step 107, a taxonomic analysis of a distribution $DIST_i$ of points 27 positioned at a distance from the node considered $N_i$ less than a predetermined threshold $S_2$ makes it possible to either:
- define, when the distribution $DIST_i$ can be aggregated, a number of aggregates $SEP_{ik}$ of points 27 for which the vertical total electron content VTEC values are uniform, and to select a step 108 of refinement of the mesh IPM by subclass $D_A$, or
- to select, when the distribution $DIST_i$ is stochastic, a step 109 of refinement of the mesh IPM by subdivision $D_S$.

Advantageously, the step 107 also comprises means making it possible to limit, for each point $N_i$, the number of aggregates $SEP_{ik}$ less than a predetermined threshold.

Figure 6:
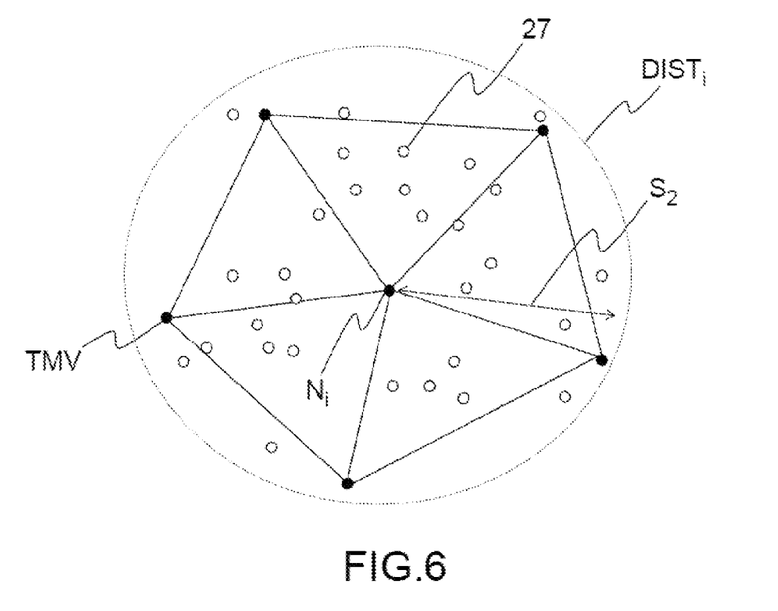
FIG. 6 illustrates the principle of the taxonomic analysis of a point distribution around a mesh node, FIGS. 7.a and 7.b illustrate the principle of a refinement of the mesh in the case of a distribution that can be aggregated, FIGS. 8.a and 8.b illustrate the principle of a refinement of the mesh in the case of a stochastic distribution, FIGS. 9.a and 9.b illustrate the principle of the adaptive method according to the invention in a simplified case of a one-dimensional distribution.

The step 107 of taxonomic analysis performed on a distribution $DIST_i$ is also illustrated by FIG. 6 described below.

The method comprises a step 108 consisting in adding a new mesh node $AMV_{ik}$ by aggregates $SEP_{ik}$ in the case where the distribution $DIST_i$ can be aggregated. The position of the new node $AMV_{ik}$ corresponds to a barycenter of the points 27 of the aggregate $SEP_{ik}$.

This step makes it possible to position the mesh nodes in proximity to the local optimums. The method adapts to the changes of the ionosphere by periodically searching for these local optimums, and a realistic mapping of the non-uniformities of the ionosphere and of its changes is obtained. This makes it possible to enhance the accuracy of the estimation of total electron content at the place of the mesh nodes and ensure a linear trend in proximity to the nodes.

In a first embodiment, the position of a new node $AMV_{ik}$ corresponds to the iso-barycenter of the points 27; an identical weighting at each point 27 being retained.

In a second embodiment, the position of a new node $AMV_{ik}$ in the case of a distribution $DIST_i$ that can be aggregated, corresponds to the barycenter of the points 27 of the aggregate $SEP_{ik}$ for which the weighting $P_{ik}$ depends on an angle formed between the transmission axis of the signal 23 of the point considered 27 and a vertical axis relative to the Earth 22 passing through this point 27. The weighting thus makes it possible to favor the points 27 determined from a signal 23 for which the transmission axis is substantially vertical; the VTEC measurements at these points being a priori more accurate. This embodiment is particularly advantageous because it makes it possible to use the most reliable points.

Advantageously, the step 108 also comprises one or more geometrical consistency criteria in order to generate a mesh IPMA that is best adapted to the dynamics of the ionosphere. A first geometrical consistency criterion consists in eliminating the nodes $N_i$ of the initial mesh IPM positioned at a distance from a new node $AMV_{ik}$, less than a predetermined threshold. A second geometrical consistency criterion consists in eliminating the new nodes $AMV_{ik}$ generated outside of a predetermined area.

Figure 7A:
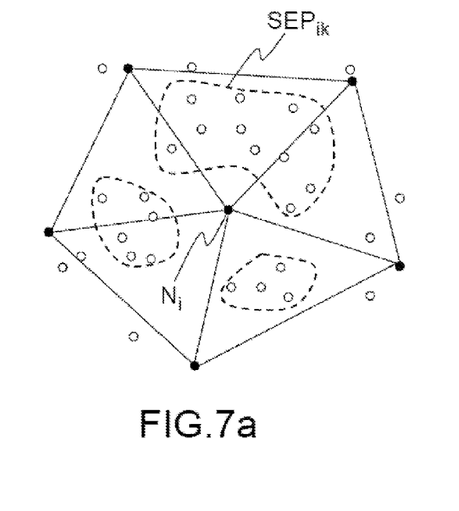
Figure 7B:
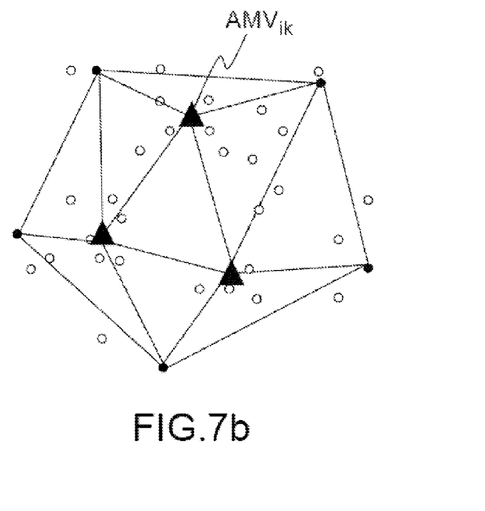

The step 108 of refining the mesh by subclass is also illustrated by FIGS. 7.*a* and 7.*b* described below.

The method comprises a step 109 consisting in adding a number of new mesh nodes $SMV_{ik}$ in the case where the distribution $DIST_i$ is stochastic; the number and the position of the new nodes $SMV_{ik}$ being defined as a function of the existing $N_i$ and of a predetermined subdivision rule.

Figure 8A:
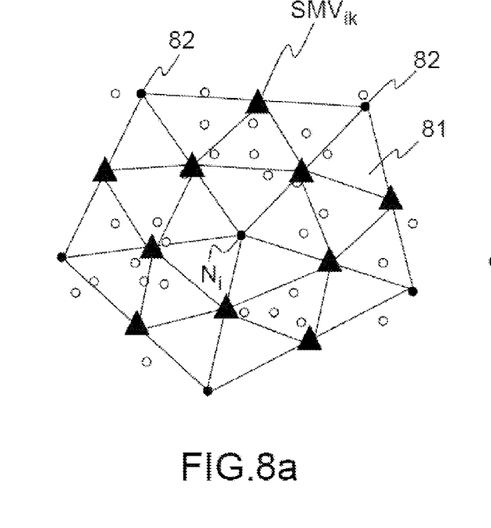
Figure 8B:
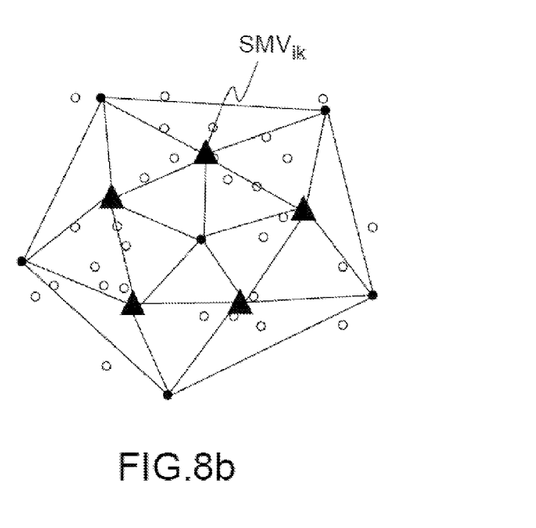

A number of subdivision techniques can be envisaged according to the invention. FIGS. 8.*a* and 8.*b* present two embodiments of the mesh refinement by subdivision. The faces to which $N_i$ belongs are identified 81. The neighboring nodes to which $N_i$ is connected are identified 82.

According to a first embodiment, a new node $SMV_{ik}$ is positioned between the node considered $N_i$ and each of the neighboring nodes 82 which are connected to it. Each new node $SMV_{ik}$ is positioned on the surface ITL, at equal distance from the node $N_i$ and from the neighboring node considered 82, so as to minimize the distance separating it from the node considered $N_i$.

According to a second embodiment, a new node $SMV_{ik}$ is positioned for each of the faces 81 to which the node considered $N_i$ belongs. The position of the new node $SMV_{ik}$ corresponds to a barycenter of the nodes $N_i$ and 82 of the face considered 81.

The step 109 of refining the mesh by subdivision is also illustrated by FIGS. 7.*a* and 7.*b* described below.

The method comprises a step 110, carried out on completion of the iterative process of the step 106, consisting in comparing the spatial dispersions of the new nodes $AMV_{ik}$ and $SMV_{ik}$ of the adapted mesh IPMA and of the nodes $N_i$ of the initial mesh IPM. The aim of this step is to define a criterion that makes it possible to validate, continue or interrupt the refining of the mesh, carried out by the steps 107, 108, 109.

The principle of the calculation is as follows:
- if $\sigma_i$ represents the spatial dispersion of a node $N_i$ determined for $n_i$ points 27,
- if $\sigma_{ik}$ represents the spatial dispersion of a new node $AMV_{ik}$ (or $SMV_{ik}$) determined for $n_{ik}$ points 27, In one embodiment, the new adapted mesh IPMA adds an enhancement compared to the initial mesh IPM, when:

$$\sigma_{ik} \cdot \chi_{n_{ik}}(AMV_{ik}) < \sigma_i \cdot \chi_{n_i}(N_i) \qquad \text{(iii)}$$

in which the parameter $\chi$ makes it possible to weight the dispersions by the number of points 27 available for the dispersion calculation.

According to the invention, step 110 comprises a selection of the following steps:
- the calculation, in a step 112, of the vertical total electron content $VTEC_i$ at each of the nodes of the adapted mesh IPMA by means of the statistical estimator ESC, in the case where the spatial dispersions of the new nodes $AMV_{ik}$ and $SMV_{ik}$ are less than the spatial dispersions of the nodes $N_i$ of the initial mesh IPM; or, in other words, when the relationship (iii) is satisfied.
- the stopping of the method, in a step 111, in the case where the spatial dispersions of the new nodes $AMV_{ik}$ and $SMV_{ik}$ are greater than the spatial dispersions of the nodes $N_i$ of the initial mesh IPM; or, in other words, when the relationship (iii) is not satisfied.
- the initiation of a new calculation, by means of the step 106 already described, of refining the mesh applied to all of the nodes of the new mesh IPMA, in the case where the spatial dispersions of the new nodes $AMV_{ik}$ and $SMV_{ik}$ are both less than the spatial dispersions of the nodes $N_i$ of the initial mesh IPM and greater than a predetermined threshold; the mesh being considered to be able to be enhanced.

Advantageously, the step 110 also comprises a test on the number of nodes of the adapted mesh IPMA. When this number exceeds a predetermined threshold, the new mesh IPMA is not validated. The method is interrupted in the step 111.

The method comprises a step 111 consisting in interrupting the adaptation of the method in favor of the method previously defined such as, for example, the TRIN model.

The method comprises a step 112 consisting in:
- calculating, in the case of a weak disturbance ($P_1$), a vertical total electron content $VTEC_i$ and its spatial trend gradient $GSE_i$ by means of the adapted statistical estimator ESCA for the initial mesh IPM,
- calculating, in the case of a strong disturbance ($P_2$), a vertical total electron content $VTEC_i$ by means of the initial statistical estimator ESC for the adapted mesh IPMA.

The method comprises a step 113 of statistical error analysis ASE of the vertical total electron content $VTEC_i$ determined in the step 112, by means of the adapted statistical estimator ESCA and of the initial mesh IPM in the case of a weak disturbance $P_1$, or by means of the initial statistical estimator ESC and of the adapted mesh IPMA in the case of a strong disturbance $P_2$. The statistical error analysis ASE makes it possible to select between two predetermined error levels, a small error $E_1$ which implies a validation of the adaptation of the method in a step 114, or a great error $E_2$ which implies the stopping of the method in a step 115.

In the case of a weak disturbance $P_1$, the statistical error analysis ASE comprises the following steps carried out in succession:
- a selection, of each of the nodes $N_i$ of a subset $SEP_{i4}$ of points 27 positioned at a distance from the node considered $N_i$ less than a predetermined threshold $S_4$,
- a calculation, for each of the points 27 of the subset $SEP_{i4}$, of a difference DIFF between the vertical total electron content $VTEC_i$ determined at the node $N_i$ by means of the statistical estimator ESCA and the vertical total electron content VTEC of the point considered 27,
- a calculation, for each of the nodes $N_i$ of a local dispersion $D_{i4}$ of the differences DIFF calculated by statistical methods, such as, for example, a covariance or a least square residue,
- a selection between two predetermined error levels, a small error $E_1$ or a great error $E_2$, as a function of a local dispersion value $D_{i4}$.

Advantageously, the statistical error analysis ASE applied in the case of a weak disturbance $P_1$ comprises a second condition capable of determining a great error $E_2$ by means of a comparison at each of the nodes $N_i$ of the value of the spatial gradient $GSE_i$ with the spatial gradient values $GSE_j$ of the neighboring nodes of the node $N_i$ considered. When gradient deviations greater than a predetermined threshold are detected, a great error $E_2$ is selected. This condition is added to the preceding conditions.

In the case of a strong disturbance $P_2$, a statistical error analysis ASE comprises, according to one and the same principle, the following steps carried out in succession:
- a selection, for each of the nodes $N_i$, $AMV_{ik}$ or $SMV_{ik}$ of the adapted mesh IPMA, of a subset $SEP_{i5}$ of points 27 positioned at a distance from the node considered $N_i$, $AMV_{ik}$ or $SMV_{ik}$ less than a predetermined threshold $S_5$,
- a calculation, for each of the points 27 of the subset $SEP_{i5}$, of a difference DIF between the vertical total electron content $VTEC_i$ determined at the node $N_i$, $AMV_{ik}$ or $SMV_{ik}$ by means of the statistical estimator ESC and the vertical total electron content VTEC of the point considered 27,
- a calculation, for each of the nodes $N_i$, $AMV_{ik}$ or $SMV_{ik}$, of a local dispersion $D_{i5}$ of the differences DIF calculated by statistical methods, such as, for example, a covariance or a least square residue,
- a selection between the two error levels, the small error $E_1$ or the great error $E_2$, as a function of a local dispersion value $D_{i5}$.

Advantageously, the statistical error analysis ASE can be limited to a part of the mesh of the surface ITL, for example by conserving only the nodes that are exposed to the sun. Advantageously, the statistical dispersion ASD and error ASE analyses take into account only a subset of the nodes Ni, AMVik or SMVik of the mesh of the surface ITL selected from one or more geometrical criteria; one of the criteria relating, for example, to the position of the nodes relative to the sun.

On completion of the step 113, a small error $E_1$ allows for the use, in a step 114, of the $VTEC_i$ values calculated at the nodes of the mesh, IPM or IPMA. Correction values on a user grid, such as, for example, the IONO grid, are determined from these $VTEC_i$ values, for example by linear interpolation. These correction values are broadcast to the users of the GNSS systems. Conversely, a great error $E_2$ results in the stopping of the method in a step 115 similar to the step 111. The values of $VTEC_i$ calculated are invalid and are not broadcast.

FIGS. 5.*a* and 5.*b* illustrate the principle of the statistical dispersion analysis ASD of the electron content of the ionosphere, as described for FIG. 4 in the step 104 of the method. For each node $N_i$ of the mesh IPM, the method comprises a step of selecting a subset $SEP_i$ of points 27 of the cloud 26 that are positioned at a distance from the node $N_i$ less than a predetermined threshold $S_1$.

FIG. 5.*a* shows, in the form of a histogram, the measured VTEC values of the points 27 for each subset $SEP_i$. The method comprises a step of calculating a dispersion $D_i$, called local dispersion, of the vertical total electron content measurements of the subset $SEP_i$.

The method then comprises a step of selecting between two ionosphere disturbance levels: a weak disturbance $P_1$ and a strong disturbance $P_2$. According to the invention, the selection between the two disturbance levels is determined by a calculation dependent on a local dispersion value $D_i$.

In one possible embodiment of the invention, the local dispersions $D_i$ are determined at each of the nodes $N_i$ by statistical methods, such as, for example, a covariance or a least square residue.

FIGS. 5.*a* and 5.*b* illustrate the principle of the statistical dispersion analysis for two disturbance levels. In FIG. 5.*a*, the dispersions are relatively limited and the calculated disturbance is weak. In FIG. 5.*b*, the dispersions are higher and the calculated disturbance is strong.

FIG. 6 illustrates the principle of the taxonomic analysis of a point distribution around a node $N_i$ of the mesh, as described for FIG. 4 in the step 107 of the method. The distribution $DIST_i$ comprises the points 27 of the cloud 26 positioned at a distance from the node $N_i$ less than a predetermined threshold $S_2$.

FIGS. 7.*a* and 7.*b* illustrate the principle of a refinement of the mesh in the case of a distribution that can be aggregated, as described for FIG. 4 in the step 108 of the method. A taxonomic analysis carried out on a distribution $DIST_i$ of points 27 makes it possible to determine a number of aggregates $SEP_{ik}$ of points 27, as represented in FIG. 7.*a*, for which a vertical total electron content dispersion is less than a predetermined threshold $S_3$.

For each of these aggregates $SEP_{ik}$, a new node $AMV_{ik}$ is defined corresponding to the barycenter of the points 27 of the aggregate $SEP_{ik}$ for which the weighting $P_{ik}$ depends on an angle formed between the transmission axis of the signal 23 of the point considered 27 and a vertical axis relative to the Earth 22 passing through this point 27. The weighting thus makes it possible to favor the points 27 determined from a signal 23 for which the transmission axis is substantially vertical; the VTEC measurements at these points being a priori more accurate.

This embodiment is particularly advantageous because it makes it possible to position the mesh nodes in proximity to the local optimums. The method adapts to the changes of the ionosphere by periodically searching for these local optimums. A realistic mapping of the non-uniformities of the ionosphere and of its changes is obtained. This makes it possible to enhance the accuracy of the estimation of total electron content on the mesh nodes and ensure a linear trend in proximity to the nodes.

Advantageously, the method also comprises one or more geometrical consistency criteria in order to generate a mesh IPMA that is best suited to the dynamics of the ionosphere. A first geometrical consistency criterion consists in eliminating the old nodes $N_i$ positioned at a distance from a new node $AMV_{ik}$ that is less than a predetermined threshold. A second geometrical consistency criterion consists in eliminating the new nodes $AMV_{ik}$ generated outside of a predetermined area.

FIGS. 8.a and 8.b illustrate the principle of a refinement of the mesh in the case of a stochastic distribution, as described in FIG. 4 in the step 109 of the method. The adapted mesh IPMA is determined from the initial mesh IPM by subdivision. A number of subdivision techniques can be envisaged according to the invention. FIGS. 8.a and 8.b present two embodiments of the refinement by subdivision. The faces to which $N_i$ belong are identified 81. The neighboring nodes to which $N_i$ is connected are identified 82.

According to a first embodiment, called subdivision by facet N+1, the adapted mesh IPMA is formed by the addition of a new node $SMV_{ik}$ between the node $N_i$ and each of the neighboring nodes 82 which are connected to it. Each new node $SMV_{ik}$ is positioned on the surface ITL, at equal distance from the node $N_i$ and from the neighboring node 82 considered; the position of the node $SMV_{ik}$ also being defined in such a way as to minimize the distance separating it from the node $N_i$.

According to a second embodiment, called barycentric subdivision, the adapted mesh IPMA is formed by the addition of a new node $SMV_{ik}$ for each of the faces 81. The position of a new node $SMV_{ik}$ corresponding to the barycenter of the nodes of the face considered 81.

Figure 9A:
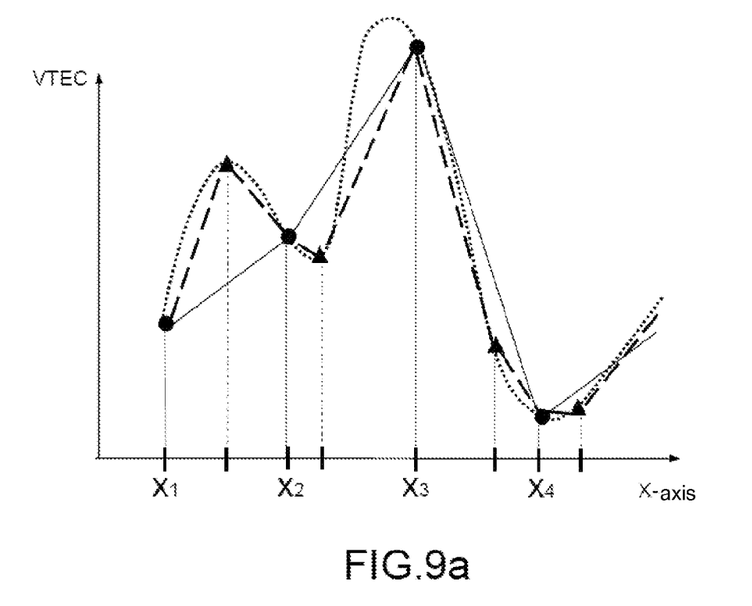
Figure 9B:
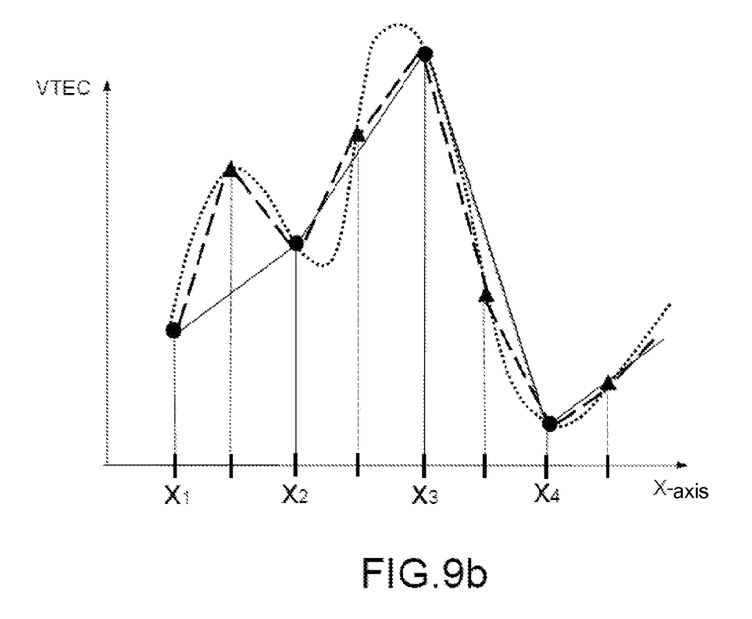

FIGS. 9.a and 9.b illustrate the principle of the adaptive method according to the invention in a simplified case of a one-dimensional distribution. As already presented for FIGS. 3.a and 3.b, the figure represents, by dotted line, a trend of the measured vertical total electron content VTEC values. The methods currently known make it possible to estimate $VTEC_i$ values, represented by round spots in FIGS. 9.a and 9.b for abscissa $x_1$, $x_2$, $x_3$ and $x_4$.

FIG. 9.a illustrates the principle of the adaptive method according to the invention after the refinement of the mesh by aggregate. In this case, the addition of nodes to the meshes performed for a subset of measurements exhibiting uniform VTEC values. The adaptive method according to the invention makes it possible to determine additional $VTEC_i$ values, represented by triangles, with increased accuracy, and in areas corresponding to local optimums.

FIG. 9.b illustrates the principle of the adaptive method according to the invention after the refinement of the mesh by subdivision. In this case, the addition of nodes to the mesh is carried out according to a predefined geometrical criteria. The adaptive method according to the invention enhances the accuracy of the estimation of the $VTEC_i$ values by augmenting the number of nodes supporting the mesh.

The invention claimed is:

1. An adaptive method for estimating an electron content of the ionosphere with an augmentation system to provide corrections for navigation systems using a global navigation satellite system, comprising the following steps performed in succession:

collecting a set of measurements carried out by a plurality of fixed receiving beacons on the ground, the plurality of fixed receiving beacons receiving radio frequency signals transmitted by a plurality of transmitting navigation satellites situated in orbit, computing with the augmentation system, for each of the signals of the set of measurements, of spatial coordinates of a point of intersection between a transmission axis of the signal and a surface surrounding the Earth, and a vertical total electron content determined at this point of intersection; a cloud of points, made up of the spatial coordinates of the point of intersection and of a vertical total electron content being thus defined, computing a statistical estimator with the augmentation system, a vertical total electron content, for each of a plurality of nodes of an initial mesh of the surface, performing a statistical dispersion analysis with the augmentation system of the vertical total electron content at each of the plurality of nodes of the initial mesh to select between two predetermined disturbance levels, a weak disturbance or a strong disturbance, of the ionosphere, a step comprising:

performing in the case of a weak disturbance, a computation to define a suitable statistical estimator, from the initial statistical estimator with the augmentation system, performing in the case of a strong disturbance, a computation making it possible to generate a new suitable mesh of the surface, from the initial mesh with the augmentation system, performing a statistical error analysis with the augmentation system of the vertical total electron content determined, by the suitable statistical estimator and of the initial mesh in the case of a weak disturbance, or by the initial statistical estimator and the suitable mesh in the case of a strong disturbance; the statistical error analysis to select between two predetermined error levels, a weak error which implies a validation of the adaptation of the method, or a strong error which implies a stopping of the method, and providing correction values based on the vertical total electron content to the navigation systems using the global navigation satellite system.

2. The method as claimed in claim 1, wherein the initial statistical estimator, determines a vertical total electron content at each of the nodes of the mesh by means of a Kalman filter taking into account the points of the cloud positioned at a distance from the node concerned less than a predetermined threshold.

3. The method as claimed in claim 1, wherein the initial mesh of the surface forms a regular polyhedron centered on the Earth having one thousand two hundred and eighty triangular faces, and in that each of the nodes of the initial mesh is at a fixed solar time.

4. The method as claimed in claim 1, wherein the statistical analysis of the dispersions comprises the following steps carried out in succession:
   a selection, for each of the nodes of the initial mesh, of a subset of points positioned at a distance from the node concerned less than a predetermined threshold,
   a computation, for each of the nodes of the initial mesh, of a local dispersion, computed by statistical methods, of the vertical total electron content of the points of the subset,
   a selection between two levels of disturbances of the ionosphere, at least as a function of a local dispersion value.

5. The method as claimed in claim 1, further comprising a step of computing a suitable statistical estimator, making it possible to compute, in addition to the vertical total electron content at each of the nodes, a spatial trend gradient of the vertical total electron content in proximity to the node concerned.

6. The method as claimed in claim 1, further comprising a step of computing a suitable mesh, determined from the initial mesh, according to an iterative process applied to each of the nodes of the initial mesh, comprising the following computation steps:
   a taxonomic analysis of a distribution of points positioned at a distance from the node concerned less than a predetermined threshold, making it possible to either:
   define, when the distribution can be aggregated, a plurality of aggregates of points for which the vertical total electron content values are uniform, and to select a step of refining the mesh by subclass,
   select, when the distribution is stochastic, a step of refining the mesh by subdivision,
   the addition of a new mesh node by aggregates in the case where the distribution can be aggregated; the position of the new node corresponding to a barycenter of the points of the aggregate,
   the addition of a number of new mesh nodes in the case where the distribution is stochastic; the number and the position of the new nodes being defined as a function of the existing nodes and of a predetermined subdivision rule.

7. The method as claimed in claim 6, wherein the position of a new node in the case of a distribution that can be aggregated, corresponds to the barycenter of the points of the aggregate for which a weighting depends on an angle formed between the transmission axis of the signal of the point concerned and a vertical axis relative to the Earth passing through this point; the weighting making it possible to favor the points determined from a signal for which the transmission axis is substantially vertical.

8. The method as claimed in claim 6, further comprising at least one of the following two subdivision rules, making it possible to add a number of new mesh nodes in the case of a stochastic distribution:
   a new node is positioned between the node concerned and each of the neighboring nodes which are connected to it; each new node being positioned on the surface, at equal distance from the node and from the neighboring node concerned, so as to minimize the distance separating it from the node concerned,
   a new node is positioned for each of the faces to which the node concerned belongs; the position of the new node corresponding to a barycenter of the nodes of the face concerned.

9. The method as claimed in claim 6, further comprising one or more geometrical consistency criteria, and in that one of the criteria consists in eliminating the nodes of the initial mesh that are positioned at a distance from a new node less than a predetermined threshold, or consists in eliminating the new nodes generated outside of a predetermined area.

10. The method as claimed in claim 6, further comprising a step, carried out on completion of the iterative process, of comparing the spatial dispersions of the new nodes of the suitable mesh and of the nodes of the initial mesh, making it possible to select between the following steps:
   the computation of the vertical total electron content at each of the nodes of the suitable mesh by means of the statistical estimator, when the spatial dispersions of the new nodes are less than the spatial dispersions of the nodes of the initial mesh,
   the stopping of the method, when the spatial dispersions of the new nodes are greater than the spatial dispersions of the nodes of the initial mesh,
   the initiation of a second computation for refining the mesh applied to all the nodes of the new mesh, when the spatial dispersions of the new nodes are both less than the spatial dispersions of the nodes of the initial mesh and greater than a predetermined threshold.

11. The method as claimed in claim 1, wherein the statistical error analysis comprises the following steps carried out in succession:
   a selection, for each of the nodes of the mesh of a subset of points positioned at a distance from the node concerned less than a predetermined threshold,
   a computation, for each of the points of the subset of a difference between the vertical total electron content determined at the node by means of the statistical estimator and the vertical total electron content of the point concerned,
   a computation, for each of the nodes of a local dispersion of the difference,
   a selection between two predetermined error levels, a weak error or a strong error, as a function of a local dispersion value.

12. The method as claimed in claim 1, wherein the statistical dispersion and error analyses take into account only a subset of the nodes of the mesh of the surface selected from one or more geometrical criteria, and in that one of the criteria relates to the position of the nodes relative to the sun.

13. The method as claimed in claim 1, herein the providing the correction values based on the vertical total electron content to the navigation systems using the global navigation satellite system further comprises broadcasting the correction values based on the vertical total electron content to the navigation systems using the global navigation satellite system.

* * * * *